United States Patent
Cheng et al.

(10) Patent No.: US 10,778,751 B2
(45) Date of Patent: Sep. 15, 2020

(54) METHOD OF MICRO-SERVICE TRANSFORMATION FOR POWER TRADING FUNCTIONS

(71) Applicants: BEIJING KEDONG POWER CONTROL SYSTEM CO LTD, Beijing (CN); NARI GROUP CORPORATION, Nanjing (CN); STATE GRID CORPORATION OF CHINA, Beijing (CN)

(72) Inventors: Lin Cheng, Beijing (CN); Haining Wang, Beijing (CN); Xian Zhang, Beijing (CN); Chuncheng Gao, Beijing (CN); Yonghui Liu, Beijing (CN); Yin Fang, Beijing (CN); Shuhong Shi, Beijing (CN); Yong Dai, Beijing (CN); Li Tao, Beijing (CN); Chunyan Wang, Beijing (CN); Mingzhu Yuan, Beijing (CN); Lei Wang, Beijing (CN); Tao Wang, Beijing (CN); Jie Liu, Beijing (CN); Xian Zhao, Beijing (CN); Xiang Tan, Beijing (CN); Ning Yang, Beijing (CN); Shoubao Li, Beijing (CN); Peiyu Xi, Beijing (CN); Qian Zhang, Beijing (CN); Dong Liu, Beijing (CN); Wujun Dong, Beijing (CN); Wentao Lv, Beijing (CN); Shulu Wan, Beijing (CN); Wei Wang, Beijing (CN); Xiaopeng Yuan, Beijing (CN); Junliang Lv, Beijing (CN); Lin Zhang, Beijing (CN); Xin Chang, Beijing (CN); Yujian Wu, Beijing (CN)

(73) Assignees: BEIJING KEDONG POWER CONTROL SYSTEM CO., LTD, Beijing (CN); NARI GROUP CORPORATION, Nanjing (CN); STATE GRID CORPORATION OF CHINA, Beijing (CN)

(*) Notice: Subject to any disclaimer, the term of this patent is extended or adjusted under 35 U.S.C. 154(b) by 350 days.

(21) Appl. No.: 15/744,910
(22) PCT Filed: Dec. 22, 2017
(86) PCT No.: PCT/CN2017/117882
§ 371 (c)(1),
(2) Date: Jan. 15, 2018
(87) PCT Pub. No.: WO2019/080335
PCT Pub. Date: Feb. 5, 2019

(65) Prior Publication Data
US 2020/0084263 A1 Mar. 12, 2020

(30) Foreign Application Priority Data
Oct. 25, 2017 (CN) .......................... 2017 1 1005376

(51) Int. Cl.
*H04L 29/08* (2006.01)
*H04L 12/24* (2006.01)
(Continued)

(52) U.S. Cl.
CPC .......... *H04L 67/10* (2013.01); *G06F 9/45558* (2013.01); *G06Q 10/103* (2013.01);
(Continued)

(58) Field of Classification Search
None
See application file for complete search history.

(56) References Cited

U.S. PATENT DOCUMENTS

2018/0159747 A1* 6/2018 Chang ................. H04L 41/5045
* cited by examiner

*Primary Examiner* — Brian Whipple
(74) *Attorney, Agent, or Firm* — Bayramoglu Law Offices LLC

(57) ABSTRACT

It involves the field of power trading technology and a method for microservice transformation of power trading function comprising the following steps: (1) divide the function in extranet trading cloud into many multiple individual micro services and divide the function in intranet trading cloud into multiple individual micro services; (2) register a node information for each individual micro service in service registry when service deployment starts; (3) extranet users and intranet users enter into extranet trading cloud and intranet trading cloud respectively through PC terminal or mobile terminal, obtain the actual network address that needs to be served from service registry, send a request to the requested service, and perform related business operation.

3 Claims, 2 Drawing Sheets

(51) Int. Cl.
*G06F 9/455* (2018.01)
*G06Q 10/10* (2012.01)
*G06Q 40/04* (2012.01)
(52) U.S. Cl.
CPC ......... *G06Q 40/04* (2013.01); *H04L 41/0659* (2013.01); *H04L 67/16* (2013.01)

METHOD OF MICRO-SERVICE TRANSFORMATION FOR POWER TRADING FUNCTIONS

This application is the U.S. national phase of International Application No. PCT/CN2017/117882 filed on 22 Dec. 2017 which designated the U.S. and claims priority to Chinese Application No. CN201711005376.1 filed on 25 Oct. 2017, the entire contents of each of which are hereby incorporated by reference.

FIELD OF TECHNOLOGY

The invention involves the field of power trading technology and especially involves a method for microservice transformation of power trading function.

BACKGROUND TECHNOLOGY

National unified power market trading platform is able to realize market functions including generation rights trade and direct trade among power users and possesses the capacity of multi-species and multi-cycle trading in parallel, which is of great practical significance to the improvement of power trading operation level and promotion of optimal allocation of power resource.

At present, national power trading market members are growing continuously and it raises higher and higher requirements on concurrency performance of system and others; however, for national unified power market trading platform in use today, project is huge in size, requirement, design, development, test and deployment procedures are fixed, new function needs to be modified and optimized on basis of original project, resource consumption rate of system is high, requiring level of the entire application is expanding, and development and maintenance are very inconvenient. Thus, it is necessary to conduct microservice transformation of power trading function to adapt to the requirement of business development on system application.

CONTENTS OF THE INVENTION

Regarding problems in background technology, the invention provides a method for microservice transformation of power trading power function. The invention divides the function to multiple individual services for realizing decoupling of solution or complex system.

In order to achieve the above objective, the invention proposes the following technical scheme.

The characteristic of microservice transformation of power trading function is that the method described includes the following steps.

(1) Divide the function in extranet trading cloud into many multiple individual micro services and divide the function in intranet trading cloud into multiple individual micro services;

(2) Register node information for each individual micro service in service registry when service deployment starts;

(3) Extranet users enter into extranet trading cloud through PC terminal or mobile terminal, obtain the actual network address that needs to be served from service registry, send a request to the requested service, and perform related business operation. Intranet users enter into intranet trading cloud through PC terminal, obtain the actual network address that needs to be served from service registry, send a request to the requested service, and perform related business operation.

Further in step (1), individual services including "bidding declaration" and "trading result query" are included in extranet trading cloud;

Individual services including "trading sequence creation", "communique release", "biding declaration", "bid opening", "declared data verification", "matchmaking trading and cleaning", "security correction" and "result release" are included in intranet trading cloud.

Further in step (3), read/write splitting of database is as follows when each micro service is performing related business operation.

Read/write splitting of data adopts ORACLE persistent layer commercial database and REDIS main memory database;

When writing data according to business need, user writes data directly to ORACLE database to ensure strong consistency of data; after successfully writing data to ORACLE database, user writes it to REDIS main memory database; when reading data, user reads it from REDIS main memory database.

Further, REDIS master-slave replication mechanism is adopted to solve it when downtime is caused due to malfunction of REDIS. Details are as follows.

When data is written to MASTER server, data files is sent to SLAVE server of through REDIS SYNC mechanism and SLAVE server will do the same operation as well to ensure data consistency;

When a SLAVE process is started, a SYNC COMMAND will be sent to MASTER to request synchronous connection;

No matter it is the first connection or re-connection, MASTER will start a background process no matter it is the first connection or re-connection to store data snapshots in data file. At the same time, MASTER will record commands for modifying data and make them cached in data file;

After background process completes cache operation, MASTER sends data file to SLAVE and SLAVE port stores data file in hard disk and load it into memory. And then MASTER will modify all data and send them to SLAVE port.

Further, in order to avoid downtime fault of MASTER and SLAVE, SENTINEL function of REDIS will be used when REDIS master-slave replication is used. Details are as follows.

If downtime is caused due to malfunction of MASTER, REDIS SENTINEL will upgrade a SLAVE to primary server and configure other SLAVE servers to make them user new MASTER; when application program is connected to REDIS server, REDIS SENTINEL will inform new MASTER address and port;

If downtime is caused due to malfunction of SLAVE, it will be re-connected after getting right. MASTER will send the complete data file to SLAVE after receiving connection of SLAVE. If MASTER receives synchronous request from many SLAVE servers, MASTER will only start a background process to store the data file and then send it to all SLAVE servers to ensure normal operation of SLAVE.

Compared with available technology, the invention has the beneficial effects that service transformation of power trading function divides each function into individual services and each service does a single thing. All services are isolated from each other and do not affect each other. Main benefits are as follows.

1 Controllable Complexity

Microservice architecture is applied as methods for multiple services through decomposing monocoque to make the complexity controllable. In order to achieve the same function, the application is decomposed into manageable branches or services. Complex function is presented by the way of modularization through microservice architect pattern to make easier development and maintenance of individual services.

2 Extensible Flexibility

Flexibility is based on microservice architect pattern to make each service expanded independently. Under microservice architecture, technology selection is relatively flexible. In such a pattern, each team can make its own judgment and select suitable technology stack according to own need for service and industry development status.

3 Independent Deployment

Microservice has independent operation process so each microservice can be deployed independently. In the way, it is not necessary to compile and deploy the entire application to make realize more efficient when a certain microservice changes. UI team can adopt AB test to make rapid deployment of changes. Microservice architect pattern makes continuous deployment possible.

4 High Pertinency of Development

In a monolithic architecture system, training cycle of new people is very long and it takes a lot of time to understand the local development environment; however, microservice architect pattern makes each service expanded independently and operation and maintenance personnel do not need to spend too much time to get familiar with the local environment but only need to understand the status of their module.

5 Reduced TCO

In a monolithic architecture system, technology layers such as control layer, logical layer and data layers are used; however, with continuous changes of market requirements, user requirements become personalized gradually, development cycle is shorter and shorter, life cycle of product starts to get shorter, and monolithic architecture system starts to face challenges. Both development cost and maintenance cost are excessively high.

By contrast, in microservice architect pattern, when a certain module breaks down, defects including in-process diffusion of monolithic architecture system won't occur and malfunction will be isolated in a single service to reduce development and maintenance costs and improve development efficiency.

SPECIFIC IMPLEMENTATION MODES

Specific implementation scheme of the invention is elaborated below in detail by combination of figures and specific implementation modes. These specific implementation modes are for account only but not for restricting the scope or implementation principle of the invention. Protective scope of the invention is still subject to claims. Obvious change or variation made on the base is included.

The invention is aimed at making microservice oriented transformation of national unified power trading platform through understanding the current condition of national unified power trading platform and high development and maintenance costs to reduce maintenance cost, improve development efficiency and reduce management difficulty.

In order to achieve the above objective, technical solution of the invention is as follows.

1. Microservice Transformation

Figure 1:
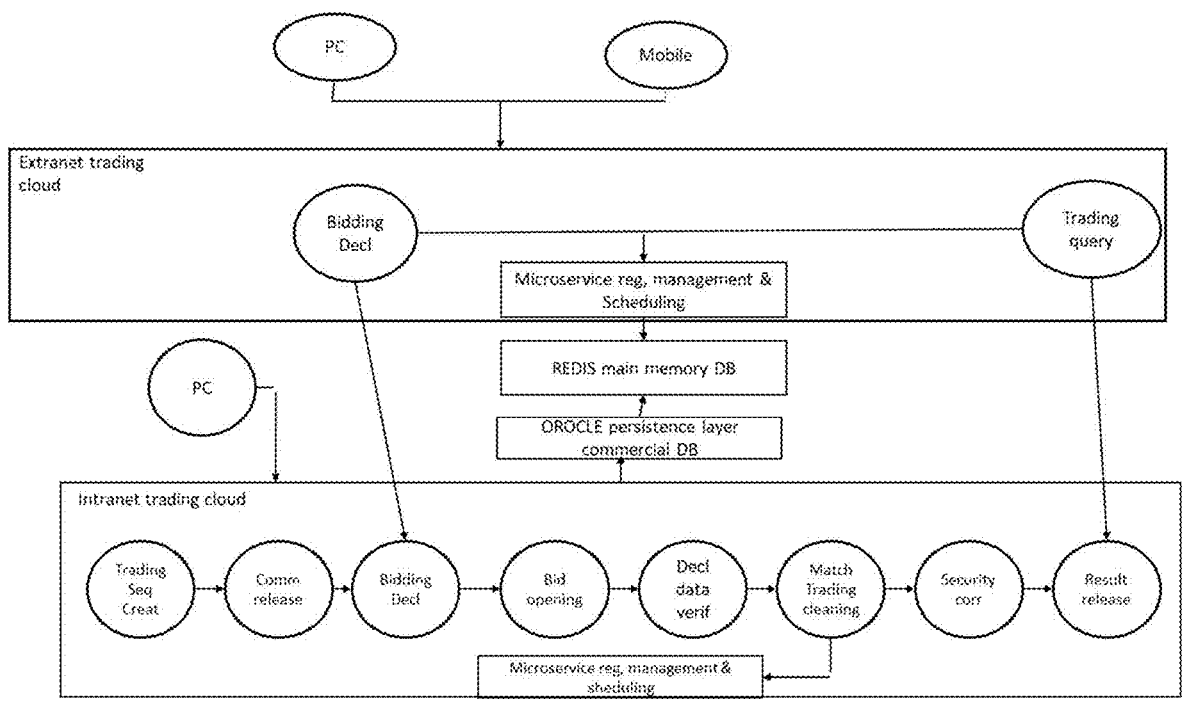
FIG. 1 is system microservice transformation flow diagram.

As shown in FIG. 1, "bidding declaration" and trading result query" in extranet trading cloud and "trading sequence creation", "communique release", "biding declaration", "bid opening", "declared data verification", "matchmaking trading and cleaning", "security correction" and "result release" in intranet trading cloud are individual microservices. Microservice here is a kind of autonomous service fully responsible for business capacity. Full responsibility here covers view layer, control layer, business logic and data storage. Autonomous service has relatively small influence to other parts in modification and won't cause any influence to functions of other services. Services are deployed in server cluster in a distributed way and used for solving the influence of high concurrency.

As shown in FIG. 1, in current national unified power trading platform, take trading module as example (each specific function in the module is separately deployed service. node information for each individual micro service will be registered in service registry when service deployment starts. User obtains the actual network address and sends a request to the service). Extranet users enter into extranet trading cloud through PC terminal or mobile terminal, obtain the actual network address that needs to be served from service registry, send a request to the requested service, and perform related business operation. Intranet users enter into intranet trading cloud and service registry through PC terminal, obtain the actual network address that needs to be served from service registry, send a request to the requested service, and perform related business operation. Please refer to "2. read/write splitting of database" for read/write synchronization in the process of related business operation in each microservice.

2. Read/Write Splitting of Database

In brief, read/write splitting is to separate database read from database write corresponding to different database servers so as to effectively relieve the pressure of database and the pressure of IO. Primary database is for write operation and slave database operation is for read which is actually most common in many systems. When write operation is done in primary database, the data shall be synchronized to slave database so as to effectively ensure the database integrity.

Figure 2:
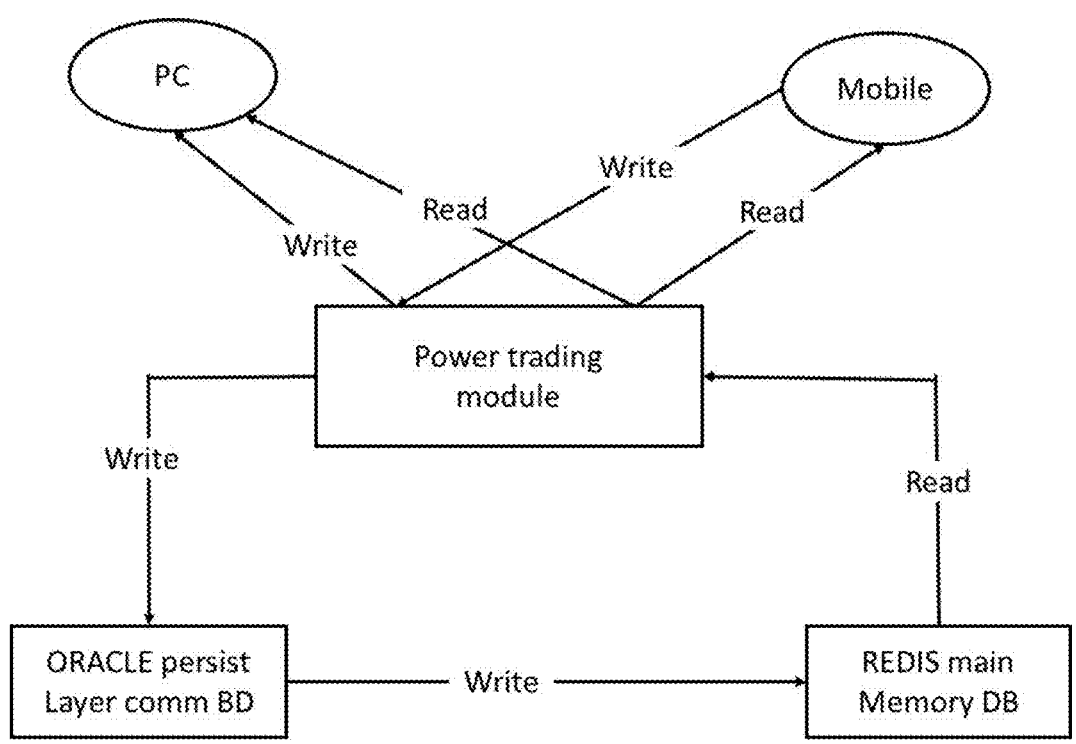
FIG. 2 is system data read/write splitting flow diagram.

As shown in FIG. 2, data read/write splitting in the invention adopts ORACLE persistent layer commercial database and REDIS main memory database. When writing data according to business need, user writes data directly to ORACLE database to ensure strong consistency of data; after successfully writing data to ORACLE database, user writes it to REDIS main memory database; when reading data, user reads it from REDIS main memory database.

At the same time, REDIS master-slave replication mechanism is adopted in order to avoid downtime of REDIS. When data is written to MASTER server, data files is sent to SLAVE server of through REDIS SYNC mechanism and SLAVE server will do the same operation as well to ensure data consistency. When a SLAVE process is started, a SYNC COMMAND will be sent to MASTER to request synchronous connection. No matter it is the first connection or re-connection, MASTER will start a background process no matter it is the first connection or re-connection to store data snapshots in data file. At the same time, MASTER will record commands for modifying data and make them cached in data file. After background process completes cache operation, MASTER sends data file to SLAVE and SLAVE port stores data file in hard disk and load it into memory. And then MASTER will modify all data and send them to SLAVE port. In order to avoid downtime fault of MASTER and SLAVE, SENTINEL function of REDIS will be used when REDIS master-slave replication is used. If downtime is caused due to malfunction of MASTER, REDIS SENTINEL will upgrade a SLAVE to primary server and configure other SLAVE servers to make them user new MASTER. When application program is connected to REDIS server, REDIS SENTINEL will inform new MASTER address and port. If downtime is caused due to malfunction of SLAVE, it will be re-connected after getting right. MASTER will send the complete data file to SLAVE after receiving connection of SLAVE. If MASTER receives synchronous request from many SLAVE servers, MASTER will only start a background process to store the data file and then send it to all SLAVE servers to ensure normal operation of SLAVE, guarantee data read/write synchronization, improve database performance, and respond to the requirement of current market in face of high concurrency.

What is claimed is:

1. A method for a microservice transformation of power trading function comprising the following steps:
   (1) dividing the function in an extranet trading cloud into multiple individual microservices and dividing the function in the intranet trading cloud into multiple individual microservices;
   (2) registering node information for each individual microservice in a service registry when service deployment starts; wherein
   (3) an extranet user enters into the extranet trading cloud through a PC terminal or a mobile terminal, obtains an actual network address that needs to be served from the service registry, and sends a request to the service registry, and wherein an intranet user enters into the intranet trading cloud and service registry through a PC terminal, obtains the actual network address that needs to be served from the service registry, and sends a request to the service registry,
   wherein in step (3), read/write splitting of data is performed, the read/write splitting of data incorporates an ORACLE persistent layer commercial database and a REDIS main memory database; and wherein when writing data, a user writes data directly to the ORACLE database to ensure consistency of data; and wherein after successfully writing data to the ORACLE database, the user writes data to the REDIS main memory database; and wherein when reading data, the user reads it from the REDIS main memory database.

2. The method according to claim 1, wherein a REDIS master-slave replication mechanism is utilized to solve downtime when downtime is caused due to malfunction of REDIS as follows: when data is written to a MASTER server, data files are sent to a SLAVE server through a REDIS SYNC mechanism and the SLAVE server will perform the same function as the MASTER server and will ensure data consistency; when a SLAVE process is started, a SYNC COMMAND will be sent to the MASTER to request synchronous connection; in response to the first connection or a re-connection, the MASTER will start a background process in response to the first connection or a re-connection to store data snapshots in a data file and, the MASTER will record commands for modifying data and cache the commands in a command data file; after the background process completes the cache operation, the MASTER sends the command data file to the SLAVE and a SLAVE port stores the command data file in hard disk and loads the command data file into memory, and then the MASTER will modify the data and send the modified data to the SLAVE port.

3. The method according to claim 1, wherein in order to avoid a downtime fault of the MASTER and the SLAVE, a SENTINEL function of REDIS is used as follows: if downtime is caused due to malfunction of the MASTER, the SENTINEL function of REDIS will upgrade a SLAVE to be a new MASTER and configure other SLAVE servers to make the other SLAVE servers use the new MASTER; when an application program is connected to a REDIS server, the SENTINEL function of REDIS will identify the new MASTER's address and port; if downtime is caused due to malfunction of the SLAVE, the SLAVE will be re-connected after correcting the malfunction, the MASTER will send the complete data file to the SLAVE after receiving connection of the SLAVE; if the MASTER receives synchronous requests from a plurality of SLAVE servers, the MASTER will only start a background process to store the data file and then send the data file to all SLAVE servers to ensure operation of the SLAVE.

* * * * *